US012717274B2

(12) United States Patent
Tan et al.

(10) Patent No.: US 12,717,274 B2
(45) Date of Patent: Aug. 25, 2026

(54) DEVELOPING CARTRIDGE FOR DETACHABLE MOUNTING TO AN IMAGING DEVICE

(71) Applicant: ZHUHAI UN-TERN IMAGING PRODUCTS CO., LTD, Zhuhai (CN)

(72) Inventors: Wugang Tan, Zhuhai (CN); Zongqian Huang, Zhuhai (CN)

(73) Assignee: ZHUHAI UN-TERN IMAGING PRODUCTS CO., LTD, Zhuhai (CN)

( * ) Notice: Subject to any disclaimer, the term of this patent is extended or adjusted under 35 U.S.C. 154(b) by 126 days.

(21) Appl. No.: 18/604,898

(22) Filed: Mar. 14, 2024

(65) Prior Publication Data

US 2025/0085663 A1 Mar. 13, 2025

(30) Foreign Application Priority Data

Sep. 13, 2023 (CN) ......................... 202322497125.7
Dec. 4, 2023 (CN) ......................... 202323301862.1

(51) Int. Cl.
*G03G 21/18* (2006.01)
*G03G 15/00* (2006.01)
(Continued)

(52) U.S. Cl.
CPC ..... *G03G 21/1892* (2013.01); *G03G 15/0121* (2013.01); *G03G 15/0849* (2013.01); *G03G 15/0856* (2013.01); *G03G 15/0863* (2013.01); *G03G 15/087* (2013.01); *G03G 15/5004* (2013.01); *G03G 15/80* (2013.01); *G03G 21/1642* (2013.01); *G03G 21/1647* (2013.01); *G03G 21/1676* (2013.01); *G03G 21/1803* (2013.01); *G03G 21/1821* (2013.01); *G03G 21/1839* (2013.01); *G03G 21/1857* (2013.01); *G03G 21/1867* (2013.01); *G03G 21/1878* (2013.01); *G03G 21/1885* (2013.01);
(Continued)

(58) Field of Classification Search
CPC ............. G03G 15/087; G03G 15/0121; G03G 15/0849; G03G 15/0856; G03G 15/0863; G03G 15/0896; G03G 15/5004; G03G 15/80; G03G 21/1642; G03G 21/1647; G03G 21/1676; G03G 21/1803; G03G 21/1821; G03G 21/1839; G03G 21/1857; G03G 21/1867; G03G 21/1878; G03G 21/1885; G03G 21/1892; G03G 21/1896; G03G 2221/1663; G03G 2221/1892
See application file for complete search history.

(56) References Cited

U.S. PATENT DOCUMENTS

2005/0176299 A1* 8/2005 Chadani ............. G03G 21/1885 439/607.01

* cited by examiner

*Primary Examiner* — Joseph S Wong
(74) *Attorney, Agent, or Firm* — Ballard Spahr LLP

(57) ABSTRACT

A developing cartridge is configured to be detachably mounted on an imaging device including a detecting device. The developing cartridge includes a housing; a rotating member rotatably provided in the housing; a driving force receiving member configured to receive a driving force from the imaging device to drive the rotating member to rotate; and a detected device configured to be in electrical contact with the detecting device when the developing cartridge is mounted in the imaging device. When the rotating member is driven by the driving force receiving member to rotate, the detected device is switched between an electrical disconnection state and an electrical connection state. An imaging device having the developing cartridge is also provided.

19 Claims, 12 Drawing Sheets

(51) Int. Cl.
*G03G 15/01* (2006.01)
*G03G 15/08* (2006.01)
*G03G 21/16* (2006.01)

(52) U.S. Cl.
CPC . *G03G 21/1896* (2013.01); *G03G 2221/1663* (2013.01); *G03G 2221/1892* (2013.01)

DEVELOPING CARTRIDGE FOR DETACHABLE MOUNTING TO AN IMAGING DEVICE

CROSS-REFERENCE TO RELATED APPLICATIONS

This application claims priority of Chinese Patent Application No. 202322497125.7, filed on Sep. 13, 2023, entitled "DEVELOPING CARTRIDGE", and Chinese Patent Application No. 202323301862.1, filed on Dec. 4, 2023, entitled "DEVELOPING CARTRIDGE". The contents of the above identified applications are hereby incorporated herein in their entireties by reference.

TECHNICAL FIELD

The present disclosure relates to the field of imaging devices, and in particular to a developing cartridge.

BACKGROUND

Developing cartridge is a toner container that is detachably mounted in an imaging device. Usually, the developing cartridge and the imaging device to which the developing cartridge is applicable are in one-to-one correspondence. For this reason, a detected device has been provided in the developing cartridge. At the same time, the imaging device is provided with a detecting device corresponding to the detected device. Through the interaction between the detected device and the detecting device, parameter information such as a type of the developing cartridge, a service life, and whether it is a new developing cartridge, etc. are determined by the imaging device.

In the prior art, the developing cartridge that is provided with a driving force receiving member and a detected device at both longitudinal ends thereof. FIG. 1A is a schematic view of the detecting device in the conventional imaging device. The detecting device includes a switching device 125 and an electric contact point 121. The switching device 125 has a first contact end 123 and a second contact end 126 located at two ends thereof and an abutting end 127 located between the two contact ends. The first contact end 123 is configured to be electrically connected to a power supply of the imaging device. Before the developing cartridge is mounted in the imaging device, the switching device 125 is electrically disconnected from the electrical contact point 121.

FIG. 1B is a side view of a detected device electrically connected to the detecting device viewed along a longitudinal direction of the developing cartridge, after the developing cartridge is mounted in the imaging device. FIG. 1C is a side view of the detected device electrically disconnected from the detecting device viewed along the longitudinal direction of the developing cartridge, after the developing cartridge is mounted in the imaging device.

As shown in FIG. 1B, when the developing cartridge is mounted in the imaging device, an abutting end 127 of the switching device 125 is electrically connected to an electrode 88 in the developing cartridge, and at the same time, the second contact end 126 is electrically connected to the electrical contact point 121. At this time, a voltage detecting unit in the imaging device can detect a voltage on the developing cartridge, and a CPU of the imaging device recognizes that a developing cartridge is mounted. The developing cartridge starts to be preheated and transmits a driving force to the driving force receiving member. The driving force receiving member transmits the driving force to a toggling block 52 provided on the same side as the electrode 88. During the rotation of the toggling block 52, when the toggling block 52 pushes the switching device 125, the switching device 125 is out of electrical contact with the electrode 88. At the same time, the switching device 125 is also out of electrical contact with the electrical contact point 121. At this time, the voltage detecting unit in the imaging device detects no voltage on the developing cartridge.

When the toggling block 52 moves away from the switching device 125, the switching device 125 returns to a position where it is in electrical contact with the electrode 88 again. At the same time, the switching device 125 comes into electrical contact with the electrical contact point 121 again, and the voltage detecting unit detects the voltage on the developing cartridge again.

The imaging device determines the parameter information of the developing cartridge by counting a number of times the voltage detecting unit detects the voltage. However, since the switching device 125 has been fixed at a predetermined position of the imaging device, as mentioned above, the driving force for driving the toggling block 52 needs to be transmitted from the driving force receiving member that is not arranged on the same side as the toggling block 52. In this way, not only a driving force transmission mechanism needs to be provided in the developing cartridge, which causes the structure of the developing cartridge to become complicated and is conducive to the miniaturization of the developing cartridge, but also the degree of freedom in designing the position of the toggling block 52 is reduced.

SUMMARY

According to various embodiments, a developing cartridge is provided.

A developing cartridge configured to be detachably mounted to an imaging device including a detecting device, which includes a housing; a rotating member rotatably provided in the housing; a driving force receiving member configured to receive a driving force from the imaging device to drive the rotating member to rotate; and a detected device configured to be in electrical contact with the detecting device when the developing cartridge is mounted in the imaging device. When the rotating member is driven by the driving force receiving member to rotate, the detected device is switched between an electrical disconnection state and an electrical connection state.

In some embodiments, the detected device includes an on-off assembly and a control member, and the control member is configured to receive the driving force from the driving force receiving member to control the on-off assembly to be disconnected or connected.

In some embodiments, the control member rotates, translationally moves, or reciprocally swings.

In some embodiments, the on-off assembly includes a first conductive member and a second conductive member, at least a part of the second conductive member is movable relative to the housing, and the control member controls the second conductive member to be electrically connected to or disconnected from the first conductive member.

In some embodiments, one end of the first conductive member is grounded.

In some embodiments, the detected device further includes an intermediating conductive member, one end of the intermediating conductive member is electrically connected to the second conductive member, and another end of the intermediating conductive member is electrically connected to the detecting device.

In some embodiments, the detected device further includes an intermediating conductive member and an end conductive member, the intermediating conductive member is electrically connected to the second conductive member and the end conductive member, and the end conductive member is electrically connected to the detecting device.

In some embodiments, the first conductive member is capable of switching between a retracted state and an extended state, and in the extended state.

In some embodiments, the developing cartridge further includes an end cover, a chip assembly, and a chip holder, wherein the end cover is connected to an end of the driving force receiving member, the chip holder is configured to carry the chip assembly, and the first conductive member is movably provided on at least one of the housing, the end cover, and the chip holder.

In some embodiments, the developing cartridge further includes a protecting member detachably connected to the chip holder, the protecting member is configured to protect the chip assembly, when the protecting member is mounted to the chip holder, the first conductive member is switched from the extended state to the retracted state.

In some embodiments, the chip assembly includes an electrical contact portion configured to be electrically contact a contact pin of the imaging device, the chip holder includes a main body and a chip mounting portion, the main body is connected to the housing, the first conductive member is provided on the main body, and the electrical contact portion is provided on the chip mounting portion.

In some embodiments, the first conductive member includes a moving member and an elastic member, the moving member is movably provided on at least one of the housing, the end cover, and the chip holder, one end of the moving member is configured to abut against a metal member of the imaging device, another end of the moving member is configured to be electrically connected to the second conductive member, and the elastic member is configured to bias the moving member towards the extended state.

In some embodiments, the moving member is made of a conductive material.

In some embodiments, the first conductive member further includes a moving block, the moving member is provided on the moving block, and the moving block is made of a non-conductive material.

In some embodiments, the moving block is provided with a receiving groove configured to receive the moving member.

In some embodiments, one end of the detected device in contact with the detecting device has a detection position, the control member receives the driving force from the driving force receiving member to move between a first position and a second position, so as to switch the on-off assembly between a disconnection state and a connection state. When the control member is in the first position, the on-off assembly is in the disconnection state, and the detection position has a first voltage value. When the control member is in the second position, the on-off assembly is in the connection state, and the detection position has a second voltage value different from the first voltage value.

A developing cartridge configured to be detachably mounted to an imaging device including a detecting device, which includes a housing having a driving end and a non-driving end; a rotating member rotatably provided in the housing; a driving force receiving member provided at the driving end and configured to receive a driving force from the imaging device to drive the rotating member to rotate; and a detected device. When the rotating member is driven by the driving force receiving member to rotate, the detected device is switched between an electrical disconnection state and an electrical connection state, detected device includes an on-off assembly and a control member, and the control member is configured to receive the driving force from the driving force receiving member to control the on-off assembly to be disconnected or connected.

In some embodiments, the on-off assembly includes a first conductive member and a second conductive member, at least a part of the second conductive member is movable relative to the housing, and the control member controls the second conductive member to be electrically connected to or disconnected from the first conductive member.

In some embodiments, the control member includes: a driving force receiving portion configured to receive the driving force; a toggling portion configured to transmit the driving force to the on-off assembly; and a driving force disconnecting portion configured to disconnect the driving force transmitted to the driving force receiving portion.

In some embodiments, the developing cartridge further includes a transmission gear connected between the rotating member and the control member, the control member is a gear having a notch in a circumferential direction thereof engaged with the transmission gear, the driving force receiving portion is gear teeth of the gear, the driving force disconnecting portion is the notch of the gear, the toggling portion protrudes from a hub of the gear in the circumferential direction.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

DETAILED DESCRIPTION OF THE EMBODIMENTS

The present disclosure will now be described in detail with reference to the accompanying drawings and embodiments in order to make the objects, technical solutions, and advantages of the present disclosure clearer. It should be understood that the specific embodiments described herein are only for explaining the present disclosure, and not intended to limit the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
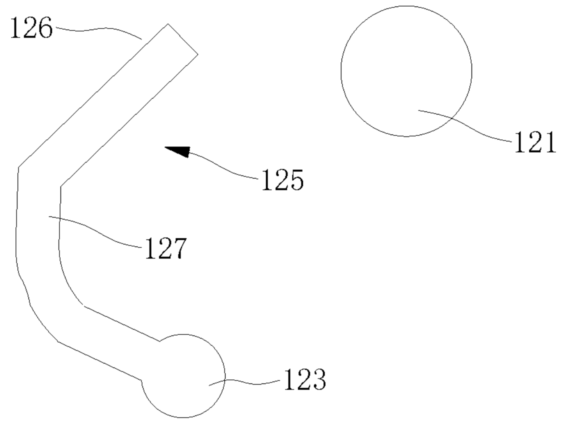
FIG. 1A (prior art)
FIG. 1A is a schematic view of a detecting device in a conventional imaging device.
Figure 1B:
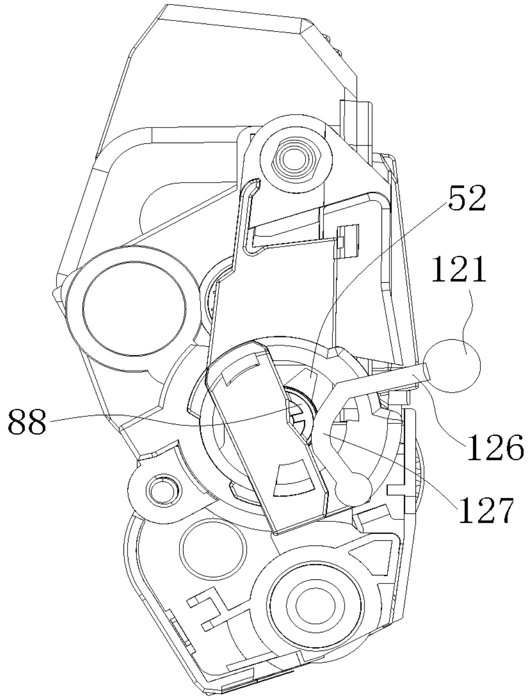
FIG. 1B (prior art)
FIG. 1B is a side view of a detected device electrically connected to the detecting device viewed along a longitudinal direction of the developing cartridge, after the developing cartridge is mounted in the imaging device.
Figure 1C:
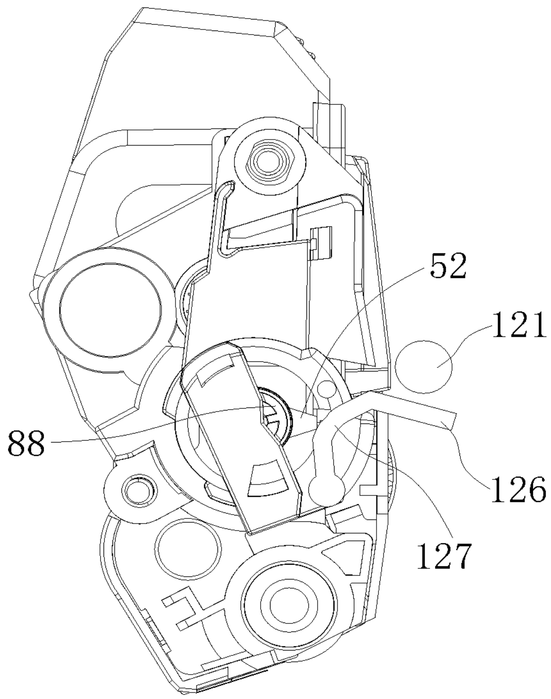
FIG. 1C (prior art)
FIG. 1C is a side view of the detected device electrically disconnected form the detecting device viewed along the longitudinal direction of the developing cartridge, after the developing cartridge is mounted in the imaging device.
Figure 2:
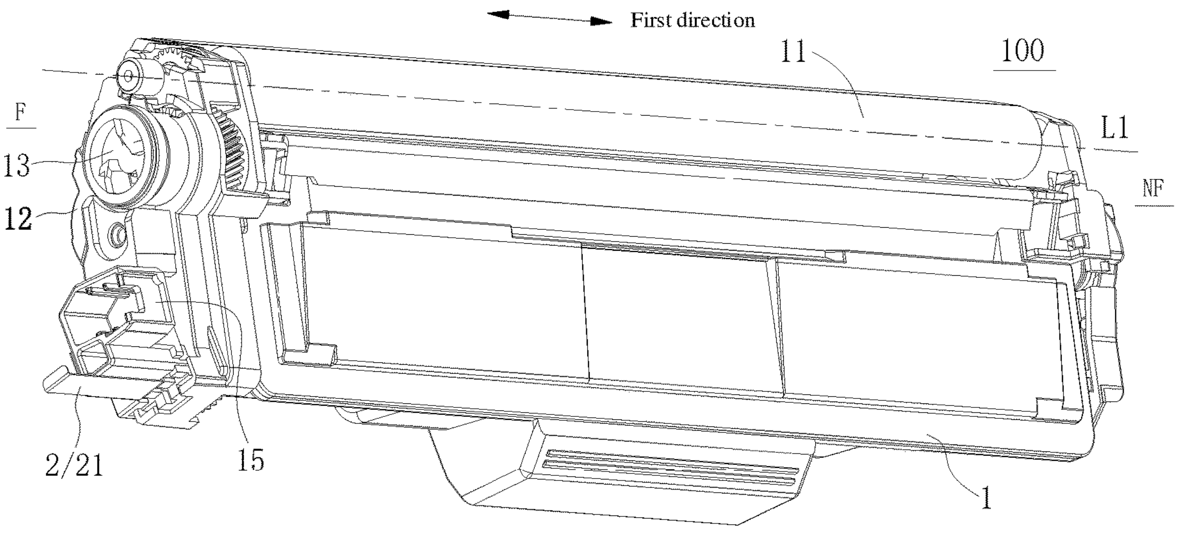
FIG. 2 is a perspective view of a developing cartridge according to a first embodiment.
Figure 3:
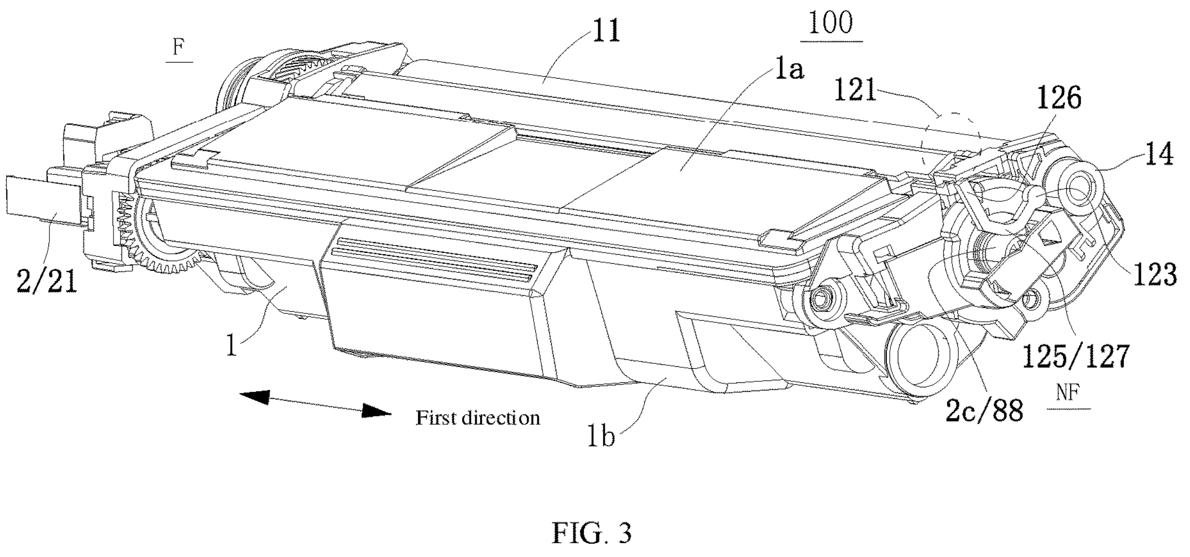
FIG. 3 is a schematic view of the developing cartridge in contact with a detecting device of an imaging device after the developing cartridge is mounted in the imaging device, according to the first embodiment.

Referring to FIGS. 2 and 3, a developing cartridge 100 according to a first embodiment is provided. The developing cartridge 100 is configured to be detachably mounted to an imaging device. The developing cartridge 100 includes a housing 1 and a rotating member rotatably provided in the housing 1. The housing 1 is configured to accommodate toner for developing. The rotating member can rotate around a rotation axis in a first direction, and the first direction is an extension direction of the housing 1.

The developing cartridge 100 includes a stirring rack (not shown) configured to stir the toner in the housing 1 and a developing roller 11 configured to carry the toner and supply the toner to a photosensitive drum formed with an electrostatic latent image. The photosensitive drum may be arranged in the developing cartridge 100 or outside the developing cartridge 100. When the developing cartridge 100 performs development in the imaging device, the developing roller 11 and the photosensitive drum are arranged opposite to each other and adjacent to each other. A rotation axis of the developing roller 11 is L1. In some embodiments, the developing cartridge 100 further includes a toner feeding roller 16 (see FIGS. 5A and 5B) rotatably provided in the housing 1. The toner feeding roller 16 is in contact with the developing roller 11 and is configured to transfer the toner to the developing roller 11. Therefore, the developing roller 11, the toner feeding roller 16, and the stirring rack may each be regarded as the rotating member, respectively.

Figure 4:
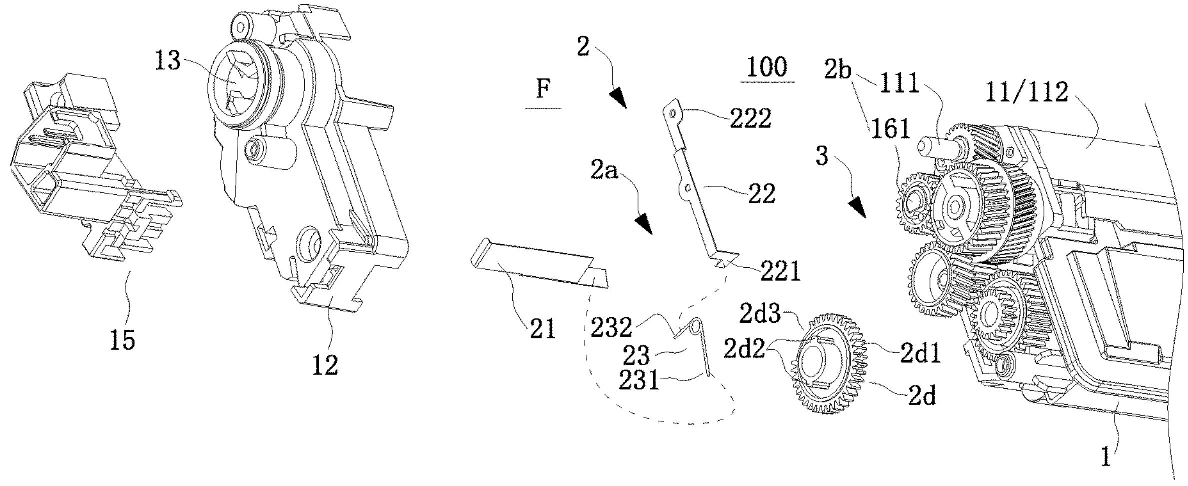
FIG. 4 is an exploded view of the developing cartridge shown in FIG. 2.

Further, referring to FIGS. 2 and 4, the developing cartridge 100 further includes a driving force receiving member 13 configured to receive a driving force from the imaging device, a driving force transmitting assembly 3, and an end cover 12 connected to an end of the driving force receiving member 13 and exposing the driving force receiving member 13. The driving force transmitting assembly 3 is configured to transmit the driving force received by the driving force receiving member 13 to each rotating member. In an embodiment, the driving force receiving member 13 is located at an end of developing cartridge 100 in the first direction. For convenience of description, the end of the developing cartridge 100 where the driving force receiving member 13 is located is referred to as a driving end F, and an end of the developing cartridge 100 opposite to the driving end F is referred to as a non-driving end NF. That is, in the first direction, the driving end F and the non-driving end NF are located at both ends of the housing 1, respectively. In some embodiments, the non-driving end NF is further configured to receive electrical power from the imaging device, and thus, the non-driving end NF is also referred to as a conductive end.

In some embodiments, the developing cartridge 100 further includes a chip assembly (not shown) configured to establish a communication connection with the imaging device and a chip holder 15 configured to carry the chip assembly. The chip holder 15 is fixed to the end cover 12 or the housing 1. In another embodiment, the chip holder 15 may be movably connected to the end cover 12 or the housing 1, which can reduce the risk of contact failure between the chip assembly and a contact pin of the imaging device due to shaking of the developing cartridge 100.

The developing cartridge 100 according to a first embodiment further includes a detected device 2. The imaging device includes a detecting device PE. The detecting device PE is configured to detect a voltage value at a contact position, i.e., a detection position, between the detected device 2 and the detecting device PE, so that parameter information of the developing cartridge 100, including but not limited to a type, a service life of the developing cartridge 100, whether the developing cartridge 100 is a new developing cartridge, etc., can be determined by the detecting device PE.

Figure 6:
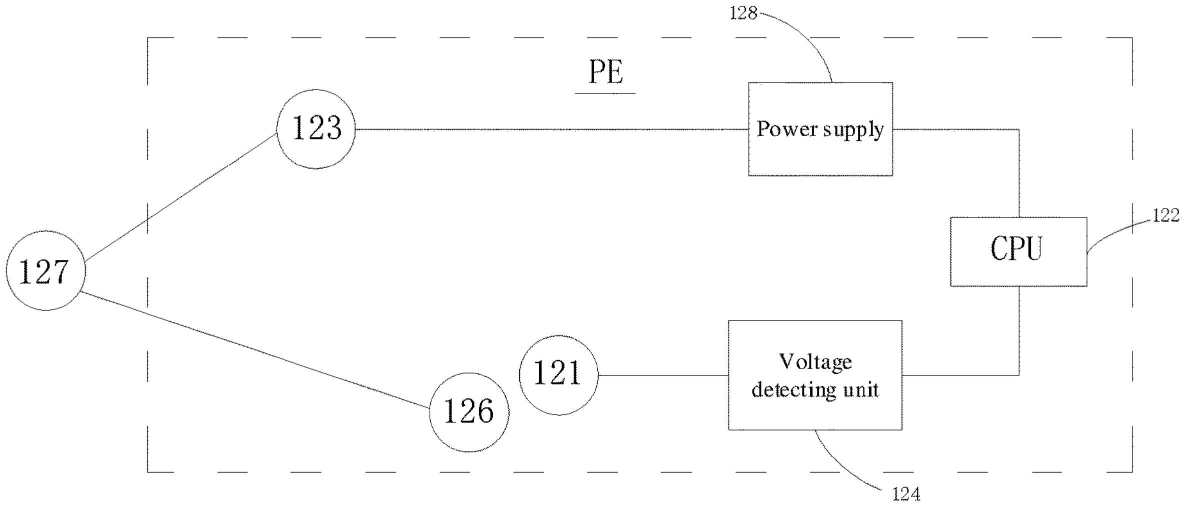
FIG. 6 is a schematic diagram of a detecting device before the developing cartridge mounted to the imaging device.

Referring to FIG. 6, the detecting device PE includes a switching device 125, a CPU 122, a voltage detecting unit 124, a power supply 128, and an electrical contact point 121. The switching device 125 includes a first contact end 123, a second contact end 126, and an abutting end 127 located between the first contact end 123 and the second contact end 126. The power supply 128 is configured to supply power to the developing cartridge 100. The power source 128 may be an external power electrically connected to the imaging device or a battery of the imaging device, etc. The voltage detecting unit 124 is configured to detect the voltage value of the detection position. The CPU 122 is configured to compare the voltage value detected by the voltage detecting unit 124 with a preset voltage threshold, and obtain the parameter information of the developing cartridge 100 based on the comparison result. For example, when the detected device 2 is in an electrical disconnection state, the voltage value detected by the voltage detecting unit 124 will exceed the preset voltage threshold, and the detecting device PE will obtain a high voltage signal. Conversely, when the detected device 2 is in an electrical connection state, the voltage value detected by the voltage detecting unit 124 will not exceed the preset voltage threshold, and the detecting device PE will obtain a low voltage signal. In one embodiment, except for the abutting end 127, other components of the detecting device PE are received in the imaging device. Therefore, the detection position is a position where the detected device 2 of the developing cartridge 100 comes into contact with the abutting end 127.

Figure 7A:
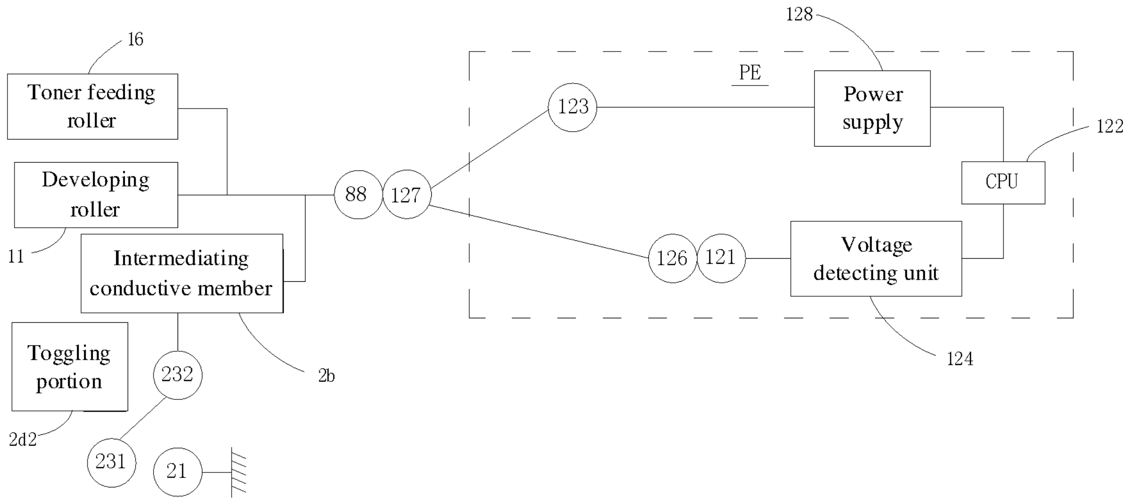
FIG. 7A is a schematic diagram of the detected device and the detecting device when the control member of the detected device is located in the first position, according to the first embodiment.
Figure 7B:
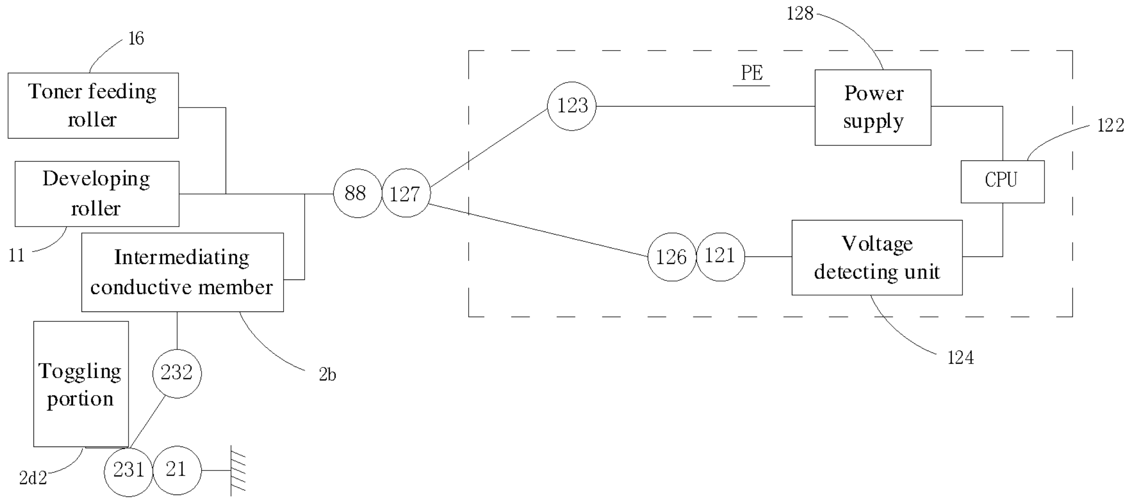
FIG. 7B is a schematic diagram of the detected device and the detecting device when the control member of the detected device is located in the second position, according to the first embodiment.

Before the developing cartridge 100 is mounted in the imaging device, the detecting device PE is in a disconnection state. As shown in FIG. 6, the first contact end 123 is electrically connected to the power supply 128 and the abutting end 127, while the second contact end 126 is not in contact with the electrical contact point 121. Referring to FIG. 7A and FIG. 7B, when the developing cartridge 100 is mounted to the imaging device, the detected device 2 pushes the abutting end 127, so that the second contact end 126 comes into contact with the electrical contact point 121, and the detecting device PE is then switched from the disconnection state to a connected state. Until the developing cartridge 100 is removed from the imaging device, the detected device 2 remains in contact with the abutting end 127, and the detecting device PE also remains in the connected state. In this way, the detecting device PE can detect the developing cartridge 100 in real-time. Specifically, the imaging device can determine the parameter information of the developing cartridge 100 according to a number of times the electrical connected and/or disconnected state of the detected device 2 within a predetermined time. Alternatively, the imaging device can determine the parameter information of the developing cartridge 100 according to a number of the high voltage signal and/or the low voltage signal obtained within the predetermined time.

In an embodiment, the process of the detected device 2 pushing the abutting end 127 may occur during the process of mounting the developing cartridge 100 to a predetermined position of the image device, or may occur after the developing cartridge 100 is mounted to the predetermined position of the imaging device, so that the detected device 2 abuts against the abutting end 127. In the latter manner, the mounting resistance of the developing cartridge 100 can be reduced, and the mounting process will be smoother.

In an embodiment, after the detected device 2 abuts against the abutting end 127, the abutting end 127 and a portion of the detected device 2 abutting against the abutting end 127 may remain stationary or is movable relative to the housing 1 of the developing cartridge 100, which is determined according to design requirements.

It should be understood that when the detected device 2 is in the electrical connection state, the voltage value at the detection position detected by the voltage detecting unit 124 may be 0V, or may be greater than 0V and less than the preset voltage threshold, both of which may be referred to as a low voltage. In some embodiments, the voltage value at the detection position detected by the voltage detecting unit 124 may also be equal to the preset voltage threshold.

Referring to FIGS. 3 and 4, the detected device 2 includes an on-off assembly 2*a*, an intermediating conductive member 2*b*, an end conductive member 2*c*, and a control member 2*d*. At least a part of the on-off assembly 2*a*, the intermediating conductive member 2*b*, and the end conductive member 2*c* are made of conductive materials and electrically connected sequentially. In an embodiment, the on-off assembly 2*a* is located at the driving end F, at least a part of the intermediating conductive member 2*b* extends in the first direction, and at least a part of the end conductive member 2*c* is located at the non-driving end NF. The end conductive member 2*c* is configured to be electrically connected to the detecting device PE when the developing cartridge 100 is mounted to the imaging device. The control member 2*d* is configured to control the on-off assembly 2*a* to switch between a first state and a second state. As shown in FIG. 3, the end conductive member 2*c* includes a conductive bracket 14 and an electrode 88 electrically connected to conductive bracket 14. The conductive bracket 14 is configured to support the developing roller 11 and/or the toner feeding roller 16, and the electrode 88 is configured to be electrically connected to the abutting end 127. In an embodiment, after the developing cartridge 100 is mounted to the imaging device, the end conductive member 2*c* remains electrically connected to the detecting device PE, so that the detected device 2 can be supplied with a stable voltage.

Each of the developing roller 11 and the toner feeding roller 16 includes a rotating shaft extending in the first direction and a coating layer coated on an outer surface of the rotating shaft. The rotating shaft may be made of metal. For example, the developing roller 11 includes a developing roller shaft 111 extending in the first direction and a developing layer 112 covering an outer surface of the developing roller shaft 111, and the toner is carried by the developing layer 112. The toner feeding roller 16 includes a toner feeding roller rotating shaft 161 extending in the first direction and a toner feeding layer covering an outer surface of the toner feeding roller rotating shaft 161, so that both the developing roller shaft 111 and the toner feeding roller shaft 161 can be regarded as the intermediating conductive member 2*b*. The developing roller shaft 111 and/or the toner feeding roller shaft 161 are electrically connected to the conductive bracket 14, so that the on-off assembly 2*a* is electrically connected to the end conductive member 2*c* through the developing roller shaft 111 and/or toner feeding roller shaft 161.

Figure 5A:
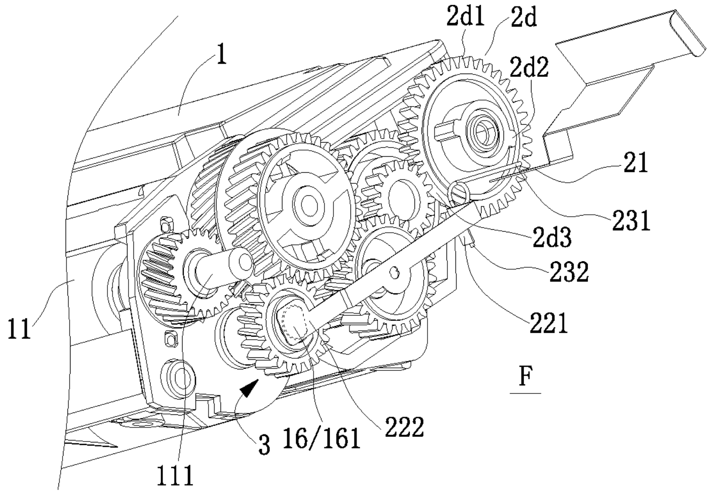
FIG. 5A is a partial perspective view of the developing cartridge when a control member of a detected device is located in a first position.
Figure 5B:
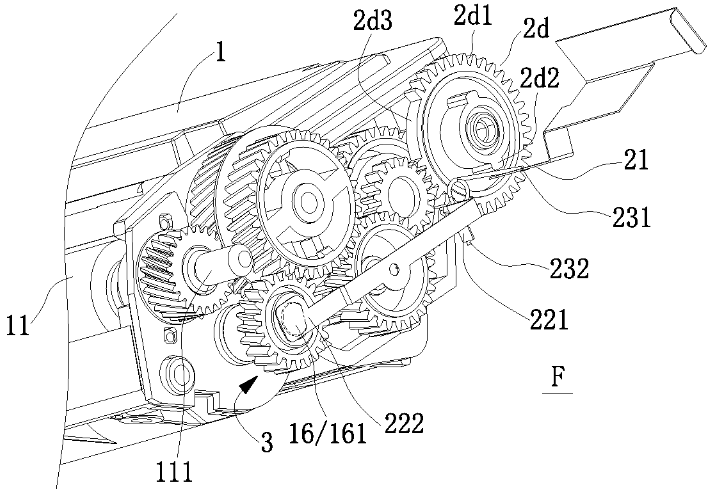
FIG. 5B is a partial perspective view of the developing cartridge when the control member of the detected device is located in a second position.

Referring to FIGS. 5A and 5B, the on-off assembly 2*a* includes a first conductive member 21, a second conductive member 23, and a third conductive member 22. At least a part of the second conductive member 23 is movable relative to the housing 1, and has a first connecting end 231 and a second connecting end 232. The first connecting end 231 is configured to be electrically connected to the first conductive member 21, and the second connecting end 232 is configured to be electrically connected to the third conductive member 22. The first conductive member 21 is directly grounded. The third conductive member 22 has a third connecting end 221 and a fourth connecting end 222, the third connecting end 221 is configured to be electrically connected to the second connecting end 232, the fourth connecting end 222 is configured to be electrically connected to the intermediating conductive member 2*b*.

The control member 2*d* is movable relative to the housing 1. Specifically, the control member 2*d* is connected to the driving force transmitting assembly 3 to receive the driving force from the receiving element 13, such that the control member 2*d* can move, for example, rotates, translationally moves, or reciprocally swings. As shown in FIG. 4, the control member 2*d* includes a driving force receiving portion 2*d*1, a toggling portion 2*d*2, and a driving force disconnecting portion 2*d*3. The driving force receiving portion 2*d*1 is configured to cooperate with the driving force transmitting assembly 3 to receive the driving force, the toggling portion 2*d*2 is configured to be in contact with the second conductive member 23, and the driving force disconnecting portion 2*d*3 is configured to disconnect the driving force transmitted from the driving force transmitting assembly 3 to the driving force receiving portion 2*d*1. With the movement of the control member 2*d*, the toggling portion 2*d*2 moves from a first position to a second position. In the first position, the on-off assembly 2*a* is in the first state, and the detection position has a first voltage value. In the second position, the on-off assembly 2*a* is in the second state, and the detection position has a second voltage value different from the second voltage value. When the detecting device PE completes the detection, the driving force disconnecting portion 2*d*3 disconnects the driving force transmitted from the driving force transmitting assembly 3 to the driving force receiving portion 2*d*1.

In this embodiment, the driving force transmission assembly 3 includes a transmission gear connected between the developing roller shaft 111 and/or the toner feeding roller shaft 161 and the control member 2*d*. The control member 2*d* is a gear having a notch in a circumferential direction thereof engaged with the transmission gear. The driving force receiving portion 2*d*1 is gear teeth of the gear. The driving force disconnecting portion 2*d*3 is the notch of the gear, that is, not all parts of a rim of the gear are provided with gear teeth. The toggling portion 2*d*2 protrudes from a hub of the gear in the circumferential direction. Toggling portions 2*d*2 may include one or a plurality of toggling blocks according to the detection requirements of the imaging device.

When the toggling block 2*d*2 is in the first position where the toggling block 2*d*2 is not in contact with the second conductive member 23, that is, the on-off assembly 2*a* is in the disconnection state, there are the following three situations.

(1) Referring to FIG. 5A and FIG. 7A, the second conductive member 23 is electrically disconnected from the first conductive member 21. In this case, the first connecting end 231 is electrically disconnected from the first conductive member 21, and the second connecting end 232 is electrically connected to the third connecting end 221. At the same time, the fourth connecting end 222 is electrically connected to the toner feeding roller shaft 161. Alternatively, the fourth connecting end 222 may be electrically connected to the developing roller shaft 111.

(2) The second conductive member 23 is electrically disconnected from the third conductive member 22. In this case, the first connecting end 231 is electrically connected to the first conductive member 21, and the second connecting end 232 is electrically disconnected from the third connecting end 221.

(3) Both the first conductive member 21 and the third conductive member 22 are electrically disconnected from the second conductive member 23. In this case, the first connecting end 231 is electrically disconnected from the first conductive member 21, and the second connecting end 232 is electrically disconnected from the third connecting end 221.

Since the on-off assembly 2*a* is in the disconnection state, the voltage applied by the power supply 128 to the developing roll 11 is greater than the preset voltage threshold, and the voltage is detected as a high voltage by the voltage detecting unit 124 of the detecting device PE, that is, the detection position has the high voltage. In this case, even if the on-off assembly 2*a* is electrically connected to the intermediating conductive member 2*b*, the intermediating conductive member 2*b* is electrically connected to the end conductive member 2*c*, and the end conductive member 2*c* is electrically connected to the abutting end 127, the detected device 2 is still in the disconnected state. At this time, the voltage value detected by the voltage detecting unit 124 is a high voltage, and the imaging device records the voltage value of the first developing cartridge 100 is detected once.

Referring to FIG. 5B, with the rotation of the control member 2*d*, the toggling portion 2*d*2 gradually is switched from the first position where it is not in contact with the second conductive member 23 to the second position where it is in contact with the second conductive member 23. When the toggling portion 2*d*2 rotates to the second position, the second conductive member 23 is electrically connected to the first conductive member 21 and the third conductive member 22 at the same time. The second conductive member 23 is further connected to a retaining member (not shown). Before the control member 2*d* rotates to the second position, the second conductive member 23 is maintained in a disconnection state from at least one of the first conductive member 21 and the third conductive member 22 through the holding member. When the control member 2*d* rotates to the second position, the toggling portion 2*d*2, i.e., the toggling block, pushes the retaining member or the second conductive member 23, so that the second conductive member 23 is electrically connected to the first conductive member 21 and the third conductive member 22 at the same time.

Referring to FIGS. 5A, 5B, 7A and 7B, the toggling portion 2*d*2 pushes the first connecting end 231 of the second conductive member 23 towards the first conductive member 21. In the second position, the first connecting end 231 of the second conductive member 23 is electrically connected to the first conductive member 21. At this time, the detected device 2 is in the electrical connected state. The voltage applied by the power supply 128 to the developing roll 11 of the developing cartridge 100 is grounded. The voltage value at the detection position detected by the detecting device PE is 0V, which is less than the preset voltage threshold, that is, the voltage value at the detection position is a low voltage, and the imaging device records the voltage value of the developing cartridge 100 is not detected once.

As the control member 2*d* continues to rotate, the toggling portion 2*d*2 is gradually separated from the second conductive member 23, the first connecting end 231 returns to the first position where the first connecting end 231 is not electrically connected to the first conductive member 21, the detecting device 2 is in the disconnected state again, and the imaging device records once again the voltage value of the developing cartridge 100 is detected.

As mentioned above, the toggling block 2*d*2 acts on the first connecting end 231 intermittently, so that the detected device 2 is switched between a disconnection state and a connection state. The disconnection state of the detected device 2 means that no current path is formed in the detected device 2, that is, a current cannot flow from one end of the detected device 2 to another end thereof, which can be achieved by disconnecting a current path between at least any two adjacent components in the detected device 2. The connection state of the detected device 2 means that the internal current path of the detected device 2 is formed, that is, the current can flow from one end of the detected device 2 to another end thereof. In this way, the voltage value applied to the developing cartridge 100 by the imaging device, which is detected by the voltage detecting unit 124 of the detecting device PE, is switched between the high voltage and the low voltage, and in a predetermined time, the high voltage and the low voltage appear alternately. When the voltage detecting unit 124 detects a high voltage, the imaging device obtains a high voltage signal. When the voltage detecting unit 124 detects a low voltage, the imaging device obtains a low voltage signal. As described above, the imaging device can determine various parameter information of the developing cartridge 100 based on a number of the high voltage signal and/or the low voltage signal obtained during the predetermined time.

In some embodiments, the imaging device may determine the parameter information of the developing cartridge 100 based on a time interval between two adjacent voltage values at the detection position detected by the voltage detecting unit 124. The two adjacent voltage values can be both the low voltage, or both can be the high voltage, or one of the voltage values can be the low voltage and the other one of the voltage values can be the high voltage. That is, the imaging device may determine the parameter information of the developing cartridge 100 based on the time interval between two adjacent low voltage signals, or the time interval between two adjacent high voltage signals, or the time interval between the low voltage signal and the high voltage signal adjacent to each other.

The second conductive member 23 is may be an elastic member made of conductive material. In this way, the second conductive member 23 has elasticity. When an external force is applied to the second conductive member 23, the second conductive member 23 can move relative to the housing 1. The second conductive member 23 is pushed by the toggling portion 2*d*2 and moves from a position where it is not electrically connected to the first conductive member 21 to a position where it is electrically connected to the first conductive member 21. Correspondingly, the detected device 2 is switched from the disconnection state to the connection state. When the toggling portion 2*d*2 no longer pushes the second conductive member 23, the second conductive member 23 returns to the position where it is not electrically connected to the first conductive member 21 from the position where it is electrically connected to the first conductive member 21 under the action of elastic force of the second conductive member 23. Correspondingly, the detected device 2 is switched from the connection state to the disconnection state.

In some embodiments, before the developing cartridge 100 receives the driving force, the second conductive member 23 is abutted by the toggling portion 2*d*2 and remains not electrically connected to the first conductive member 21. As the control member 2*d* rotates, the toggling portion 2*d*2 gradually no longer abuts the second conductive member 23. Under the action of the elastic force of the second conductive member 23, the second conductive member 23 is electrically connected to the first conductive member 21. Therefore, the toggling block 2*d*2 may act on the first connecting end 231 of the second conductive member 23 by pushing, pulling or pressing.

As mentioned above, the control member 2*d* may rotate, translationally move, or reciprocally swing. For example, the control member 2*d* may slide between the first position and the second position along a predetermined path, which may be a straight path or a curved path. Alternatively, the control member 2*d* may rotate around a predetermined rotation axis. Alternatively, the control member 2*d* may reciprocally swing around a predetermined rotation axis.

In some embodiments, before the developing cartridge 100 receives the driving force, under the elastic force of the second conductive member 23 or under the action of the toggling portion 2*d*2 of the control member 23, the second conductive member 23 remains electrically connected the first conductive member 21. At this time, the detected device 2 is in the connection state. As the control member 2*d* rotates, the toggling portion 2*d*2 gradually act on the second conductive member 23, and the second conductive member 23 is connected to the second conductive member 23. The second conductive member 23 moves from the position where the second conductive member 23 is electrically connected to the first conductive member 21 to the position where the second conductive member 23 is not electrically connected to the first conductive member 21. At this time, the detected device 2 is in the disconnection state.

In some embodiments, when the second conductive member 23 is a rigid body, the detected device 2 is further provided with a resetting member configured to force the second conductive member 23 to reset. Optionally, when the developing cartridge 100 is configured such that the detecting device PE only needs to detect low voltage or high voltage once, no resetting member may be provided.

According to the above description, in an embodiment, the first position may refer to the position where the toggling portion 2*d*2 of the control member 2*d* is not in contact with the second conductive member 23, the on-off assembly 2*a* is in the first state. According to a positional relationship between the second conductive member 23 and the first conductive member 21, the on-off assembly 2*a* is in the disconnection state. At this time, the detected device 2 is also in the disconnection state, and the first voltage value is a high voltage. Alternatively, the on-off assembly 2*a* may be in the connection state, at this time, the detected device 2 is also in the connection state, and the first voltage value is a low voltage. Correspondingly, the second position may refer to the position where the toggling portion 2*d*2 of the control member 2*d* is in contact with the second conductive member 23, and the on-off assembly 2*a* is in the second state. According to the positional relationship between the second conductive member 23 and the first conductive member 21, the on-off assembly 2*a* is in the connection state, at this time, the detected device 2 is also in the connection state, and the second voltage value is a low voltage. Alternatively, the on-off assembly 2*a* may be in the disconnection state, at this time, the detected device 2 is also in the disconnection state, and the second voltage value is a high voltage.

In another embodiment, the first position may refer to the position where the toggling portion 2*d*2 of the control member 2*d* is in contact with the second conductive member 23, and the on-off assembly 2*a* is in the first state. According to the positional relationship between the second conductive member 23 and the first conductive member 21, the on-off assembly 2*a* is in the disconnection state. At this time, the detected device 2 is in the disconnection state, and the first voltage value is a high voltage. Alternatively, the on-off assembly 2*a* may be in the connection state, at this time, the detected device 2 is also in the connection state, and the first voltage value is a low voltage. Correspondingly, the second position may refer to the position where the toggling portion 2*d*2 of the control member 2*d* is not in contact with the second conductive member 23, and the on-off assembly 2*a* is in the second state. According to the positional relationship between the second conductive member 23 and the first conductive member 21, the on-off assembly 2*a* is in the connection state, at this time, the electrical current of the detected device 2 is also in the connection state, and the second voltage value is a low voltage. Alternatively, the on-off assembly 2*a* may be in the disconnection state, at this time, the detected device 2 is also in the disconnection state, and the second voltage value is a high voltage.

In an embodiment, the third conductive member 22 can be omitted. At this time, the second conductive member 23 can be directly electrically connected to the intermediating conductive member 2*b*. Alternatively, the third conductive member 22 is still provided, but the third conductive member 22 and the second conductive member 23 are integrally formed into an assembly, at least a part of which is movable relative to the housing 1, and the assembly is electrically connected to the intermediating conductive member 2*b*.

The intermediating conductive member 2*b* may be the developing roller shaft 111 mentioned above, or may be the developing layer 112 or the toner feeding roller shaft 161 or the toner feeding layer. When a stirring rack is made of conductive material, the intermediating conductive member 2*b* may also be the stirring rack configured to stir the toner in the housing 1. The stirring rack can not only prevent the toner from agglomerating, but also can transport the toner to the toner feeding roller 16 and/or the developing roller 11. As shown in FIG. 3, the housing 1 includes a first housing 1*a* and a second housing 1*b* connected to the first housing 1. A cavity configured to accommodating toner is formed between the first housing 1*a* and the second housing 1*b*. The intermediating conductive member 2*b* may also be at least one of the first housing 1*a* and the second housing 1*b*. When the housing 1 is formed integrally, the intermediating conductive member 2*b* may also be the housing 1.

In an embodiment, the developing cartridge 100 may further include a conductor extending in the first direction. One end of the conductor is electrically connected to the on-off assembly 2*a*, and the other end of the conductor is electrically connected to the end conductive member 2*c*. The conductor can be rotatably arranged in the developing cartridge 100 or fixedly connected to the housing 1. In this case, the intermediating conductive member 2*b* is the conductor. The conductor may be a rigid body such as the developing roller shaft 111, or may be formed as a flexible body such as a metal sheet. In the above embodiments, both the rotating member and the housing 1 made of conductive material can be regarded as the conductor. In other embodiments, the conductor may also be a toner outlet blade, a sealing sheet, etc., which extends in the first direction and is in contact with a surface of the developing layer 112. The toner outlet blade is fixedly mounted in the housing 1 and is configured to adjust a thickness of a toner layer on the surface of the developing roller 11. The sealing sheet is a flexible sheet-shaped body, which is configured to seal a space between the developing roller 11 and the housing 1 to prevent the toner from leaking from the space.

It should be understood that no matter how the intermediating conductive member 2*b* is arranged, as long as the voltage value at the detection position can meet the detection requirements of the detecting device PE.

In some embodiments, a part of the on-off assembly 2*a* extends along the first direction. For example, a part of the second conductive member 23 extends from the driving end F to the non-driving end NF and is electrically connected to the end conductive member 2*c*. In this case, the intermediating conductive member 2*b* may be omitted. Further, a voltage dropping member that can meet the detection requirements is provided in the on-off assembly 2*a*, so that the voltage value at the detection position can meet the detection requirements of the detecting device PE.

In some embodiments, the end conductive member 2*c* may only include the conductive bracket 14, which is electrically connected to the developing roller 11 and/or the toner feeding roller 16. When the developing cartridge 100 is mounted to the imaging device, the conductive bracket 14 is electrically connected to the abutting end 127. Alternatively, the end conductive member 2*c* may only include the electrode 88, which is electrically connected to the developing roller 11 and/or the toner feeding roller 16. When the developing cartridge 100 is mounted to the imaging device, the electrode 88 is electrically connected to the abutting end 127. In this way, the developing cartridge 100 is electrically connected to the detecting device PE through the end conductive member 2*c*, so that the developing roller 11 and the toner feeding roller 16 receive power supplied by the imaging device.

Since the developing layer 112 is directly exposed on the housing 1, when the intermediating conductive member 2*b* is the developing layer 112, compared with an embodiment in which the end conductive member 2*c* is in contact with the developing roller shaft 111 or the toner feeding layer or the toner feeding roller shaft 161, a contact between the end conductive member 2*c* and the developing layer 112 is easier to achieve and the contact is more stable. Furthermore, when the end conductive member 2*c* only includes the conductive bracket 14 or only the electrode 88, the conductive bracket 14 or the electrode 88 can be directly in contact with the developing layer 112, and a portion of the conductive bracket 14 or electrode 88 is located at the non-driving end NF. Further, in some embodiments, the detected device 2 may also be configured such that when the developing cartridge 100 is mounted to the imaging device, the end of the on-off assembly 2*a* extending to the non-driving end NF is electrically connected to the abutting end 127. Meanwhile, the end conductive member 2*c* may be omitted, and the detected device 2 only includes the on-off assembly 2*a*. In the embodiment, the developing cartridge 100 may be configured such that the developing roller 11 and the toner feeding roller 16 receive power supplied from the imaging device without being electrically connected to the abutting end 127 of the detecting device PE through the end conductive member 2*c*. For example, an additional conductive member is provided in the developing cartridge, and the additional conductive member is configured to receive the power supplied by the imaging device for the developing roller 11 and/or the powder feeding roller 16. The control member 2*d* is configured to control on-off of the electrical connection between the on-off assembly 2*a* and the abutting end 127. In this case, before the developing cartridge 100 receives the driving force, the on-off assembly 2*a* and the abutting end 127 may be in a connection state or may be in a disconnection state.

Figure 8A:
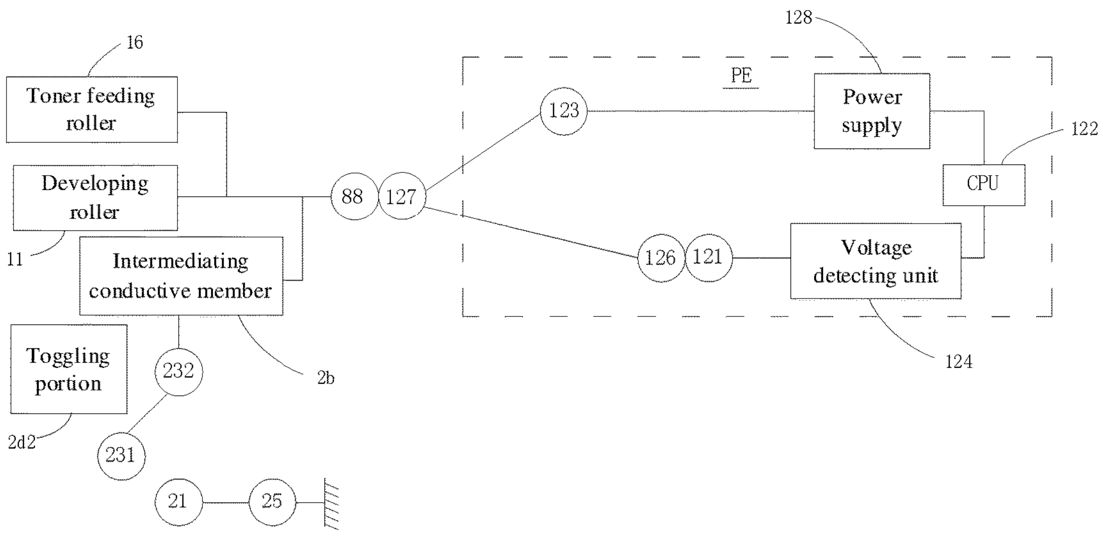
FIG. 8A is a schematic diagram of the detected device and the detecting device when the control member of the detected device is located in the first position, according to a second embodiment.
Figure 8B:
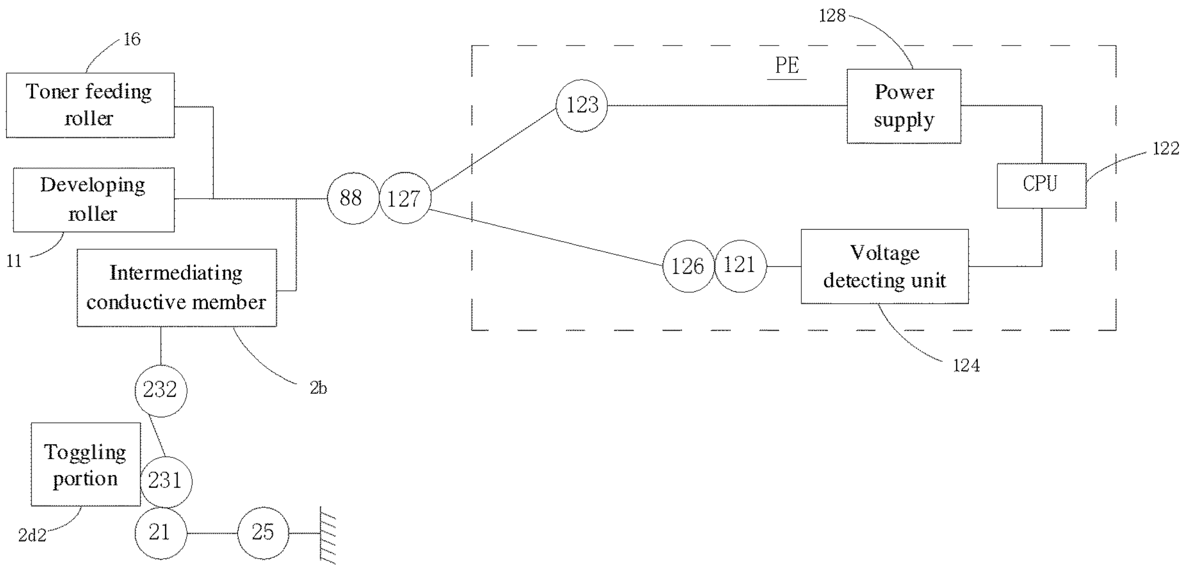
FIG. 8B is a schematic diagram of the detected device and the detecting device when the control member of the detected device is located in the second position, according to the second embodiment.

As mentioned above, the first voltage value may be a high voltage, or a low voltage, and the low voltage is 0V, or greater than 0V, and less than the preset voltage threshold. Referring to FIG. 8A and FIG. 8B, in a second embodiment, the detected device 2 is further provided with an impedance element 25 in series with the first conductive member 21, so that the voltage value carried by the impedance element 25 is greater than 0V and less than the preset voltage threshold, that is, the voltage value carried by the resistance element 25 is a low voltage.

Specifically, as shown in FIG. 8A, one end of the impedance element 25 is electrically connected to the first conductive member 21, and the other end of the impedance element 25 is grounded. That is, the first conductive member 21 is indirectly grounded through the impedance element 25. When the toggling portion 2*d*2 of the control member 2*d* is located at the first position, the second conductive member 23 is electrically disconnected from the first conductive member 21, the on-off assembly 2*a* is in the disconnection state, and the detected device 2 is also in the disconnection state. The first voltage value at the detection position detected by the detecting device PE is the high voltage, and the imaging device records the voltage value of the developing cartridge 100 is detected once.

As shown in FIG. 8B, when the driving force receiving member 13 receives the driving force, the toggling portion 2*d*2 of the control member 2*d* moves from the first position toward the second position, and the on-off assembly 2*a* is also gradually switched from the electrical disconnection state to the electrical connection state. At the same time, the detected device 2 is also switched from the disconnection state to the connection state. Until the second conductive member 23 is electrically connected to the first conductive member 21, the detected device 2 is grounded, and the voltage applied by the power supply 128 to the developing roller 11 is grounded. The second voltage value at the detection position detected by the detecting device PE is the low voltage carried by the impedance element 25. The imaging device records the voltage value of the developer cartridge 100 is not detected once. In some embodiments, the impedance element 25 may be arranged between the first conductive member 21 and the electrode 88, and the first conductive member 21 is grounded. In some embodiments, the first conductive member 21 or the impedance element 25 may be directly electrically connected to a grounding member in the imaging device, or may be electrically connected to the photosensitive drum and is grounded through the photosensitive drum.

In an embodiment, the impedance element 25 is a resistor having a resistance value no more than 1 MΩ.

In some embodiments, when the low voltage is greater than 0 and less than the preset voltage threshold, the on-off assembly 2*a* is in the connection state, at this time, the first voltage value is low. When the on-off assembly 2*a* is in the disconnection state, the second voltage value is a high voltage.

It can be seen that the toggling portion 2*d*2 of the control member 2*d* can be configured to control the on-off assembly 2*a* to be switched between the first state and the second state. When the toggling portion 2*d*2 is located in the first position, the on-off assembly 2*a* is in the first state. At this time, the on-off assembly 2*a* can be in the connection state or in the disconnection state. Correspondingly, the detected device 2 can be in the connection state or in the disconnection state. At this time, the detection position has the first voltage value. When the toggling portion 2*d*2 is located in the second position, the on-off assembly 2*a* is in the connection state, and the detected device 2 is in the second state. The detection position has a second voltage value, and the first voltage value is different from the second voltage value.

In some embodiments, the control member 2*d* may be arranged at the non-driving end NE. The driving force is transmitted from the driving end F to the non-driving end NF through the rotating member. Specifically, a gear can be mounted to the non-driving end of the developing roller 11 or the toner feeding roller 16, and the control member 2*d* is driven by the gear. Further, the on-off assembly 2*a* may also be arranged at the non-driving end NF, in which case the first conductive member 21 will be grounded at the non-driving end NE. Thus, the control member 2*d* and the on-off assembly 2*a* can be arranged at the driving end F or at the non-driving end NF.

In other embodiments, the imaging device may supply a positive voltage or a negative voltage to the developing cartridge 100. It should be understood that the first voltage value and the second voltage value both refer to the absolute value of the voltage value. The technical solution of the present disclosure can be applicable to both the imaging device supplying the positive voltage or the negative voltage.

A third embodiment of the developing cartridge 100 is provided, which is similar to the first and the second embodiment. The first conductive member 21 of the third embodiment will be described, while other structures are same as the above embodiments, and the labels of the same components as the above embodiments will be directly referenced in this embodiment.

Figure 9:
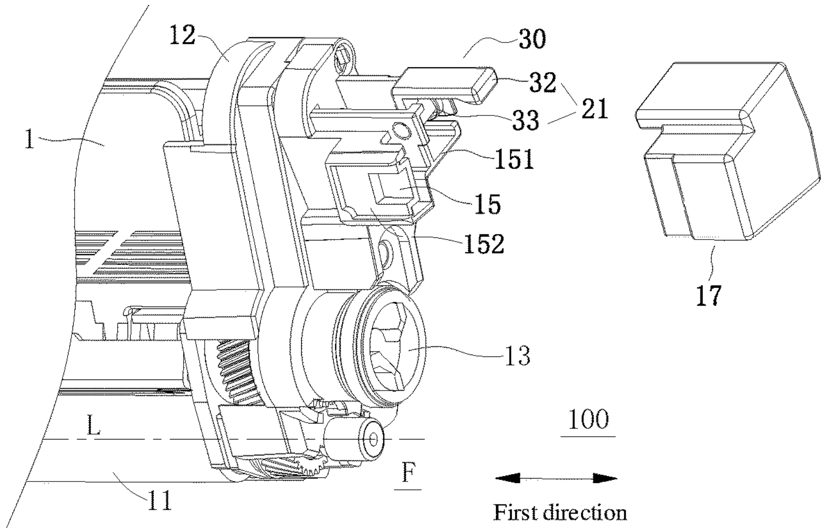
FIG. 9 is a perspective view of the driving end of the developing cartridge according to a third embodiment.

As shown in FIG. 9, the developing cartridge 100 according to the third embodiment further includes a protecting member 17 detachably connected to chip holder 15, and the protecting member 17 is configured to protect the chip assembly carried by the chip holder 15. The first conductive member 21 is movably arranged on at least one of the housing 1, the end cover 12, and the chip holder 15. When the protecting member 17 is mounted to chip holder 15, the first conductive member 21 is in a retracted state and is protected by the protecting member 17. When the protector 17 is removed from the chip holder 15, the first conductive member 21 is converted from the retracted state to an extended state. The first conductive member 21 in the extended state has a low voltage. For example, the first conductive member 21 is grounded. Specifically, the first conductive member 21 is grounded by abutting against a metal member of the imaging device directly or indirectly.

That is, at least a part of the first conductive member 21 is movably arranged on at least one of the housing 1, the end cover 12, and the chip holder 15, and at least the part of the first conductive member 21 can be converted between the retracted state and the extended state. In the retracted state, the at least part of the first conductive member 21 is protected by the protecting member 17, and in the extended state, the at least part of the first conductive member 21 is grounded directly or indirectly.

In the following description, the first conductive member 21 movably arranged on the chip holder 15 is taken as an example.

The chip holder 15 includes a main body 151 and a chip mounting portion 152. The main body 151 is connected to the end cover 12 or the housing 1. The chip assembly includes an electrical contact portion configured to be in electrical contact with the contact pin. At least the electrical contact portion of the chip assembly is provided on the chip mounting portion 152, and the first conductive member 21 is provided on the main body 151.

Figure 10:
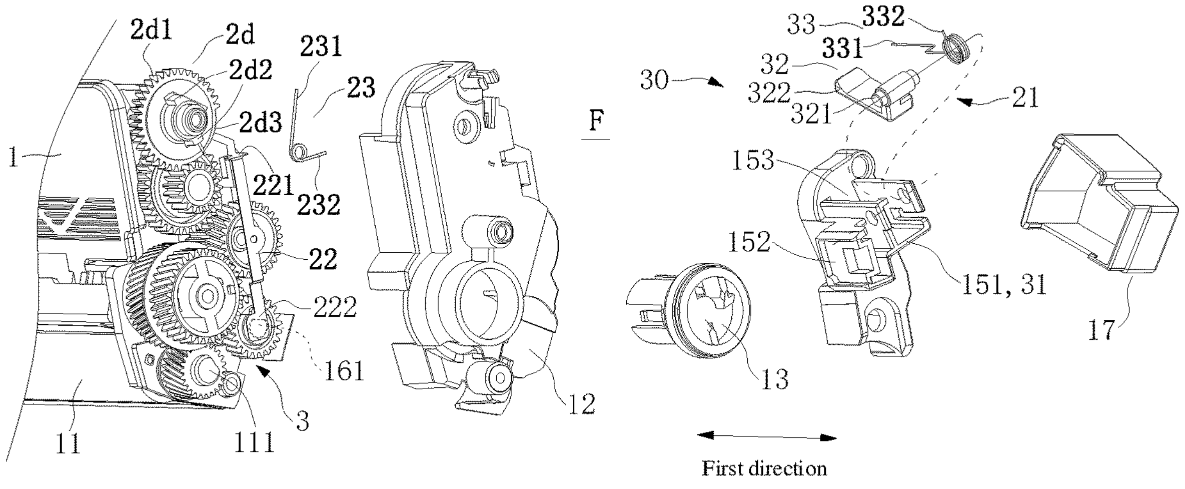
FIG. 10 is an exploded view of driving end of the developing cartridge of FIG. 9.

As shown in FIG. 9 and FIG. 10, in an embodiment, the developing cartridge 100 further includes a moving assembly 30, which is configured to ground the second conductive member 23. Specifically, one end of the moving assembly 30 is electrically connected to the second conductive member 23, and the other end of the moving assembly 30 is configured to be grounded. Whether the end of the moving assembly 30 is electrically connected to the second conductive member 23 can be controlled according to the manner described in the above embodiments.

The moving assembly 30 includes a supporting base 31 and a first conductive member 21. The supporting base 31 is a part of the main body 151. In this way, a space occupied by the chip holder 15 can be fully utilized, so that the first conductive member 21 can be effectively arranged without increasing a size of the developing cartridge 100.

In this embodiment, the first conductive member 21 includes a moving member 32 and an elastic member 33 which are arranged separately. The elastic member 33 is configured to bias the moving member 32 towards an extended state. At least a part of the moving member 32 and at least a part of the elastic member 33 are made of conductive material. As shown in FIG. 10, the moving member 32 is a conductive block made of conductive material. The moving member 32 includes a moving portion 321 and a contact portion 322. The moving portion 321 is configured to enable the moving member 32 to be movably provided on the supporting base 31. The contact portion 322 abuts against the metal member of the imaging device. The moving member 32 may be rotatably or slidably arranged on the support base 31. In this embodiment, the moving portion 321 and the support base 31 are in a shaft-hole fit. Referring to FIG. 10, the moving portion 321 is provided with a shaft, and the supporting base 31 is provided with a hole configured to receive the shaft, so that the moving portion 321 can rotate relative to the supporting base 31. It should be understood that the hole in the shaft-hole fit can be a through hole or a blind hole. The elastic member 33 may be a torsion spring and has a first end 331 in contact with the second conductive member 23 and a second end 332 in contact with the moving member 32. With the movement of the control member **2*d*, whether the first end 331 of the elastic member 33 and the second conductive member 23 are in an electrical connection state (i.e., whether the first end 331 of the elastic member 33 is in contact with or separated from the second conductive member 23**) can be controlled.

Figure 11:
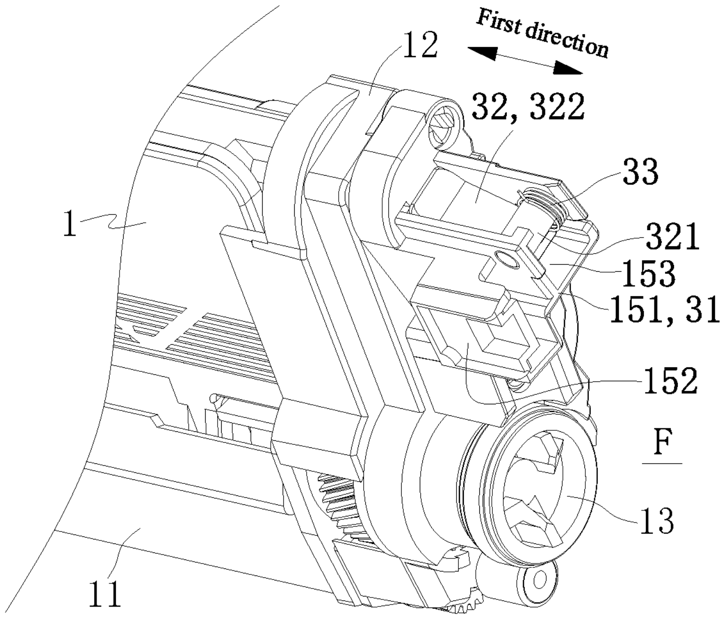
FIG. 11 is a perspective view of a first conductive member in the detected device of FIG. 9 in a retracted state.

Further, the chip holder 15 is further provided with a receiving cavity 153. In order to more clearly observe the retracted state of the first conductive member 21, the protecting element 17 is removed from FIG. 11. It should be understood that at least part of the main body 151 of the chip holder 15 and at least part of the moving assembly 30 are protected by the protecting element 17. As shown in FIG. 11, at least the moving member 32 is received in the receiving cavity 153. In an embodiment, the elastic part 33 may be also received in the receiving cavity 153.

As shown in FIG. 9, when the protecting member 17 is removed from the chip holder 15, the elastic element 33 is elastically restored, such that the moving member 32 rotates around the shaft to protrude from the receiving cavity 153. At this time, the moving member 32 is in the extended state and can abut against the metal member of the imaging device.

In some embodiments, the moving member 32 may further includes a guiding portion (not shown). When the protecting member 17 is mounted in the first direction from the driving end F to the non-driving end NF, the moving member 32 can be pushed by the protecting member 17 through the guiding portion to overcome the elastic force of the elastic member 33 and move from a state protruding from the receiving cavity 153 to a state received in the receiving cavity 153. In this process, the user does not have to operate the moving member 32 exclusively, thereby improving the operation efficiency. It should be noted that a mounting direction of the protecting member 17 does not necessarily need to be along the first direction, and the protecting member 17 can also be mounted along a direction intersecting with the first direction.

Figure 12:
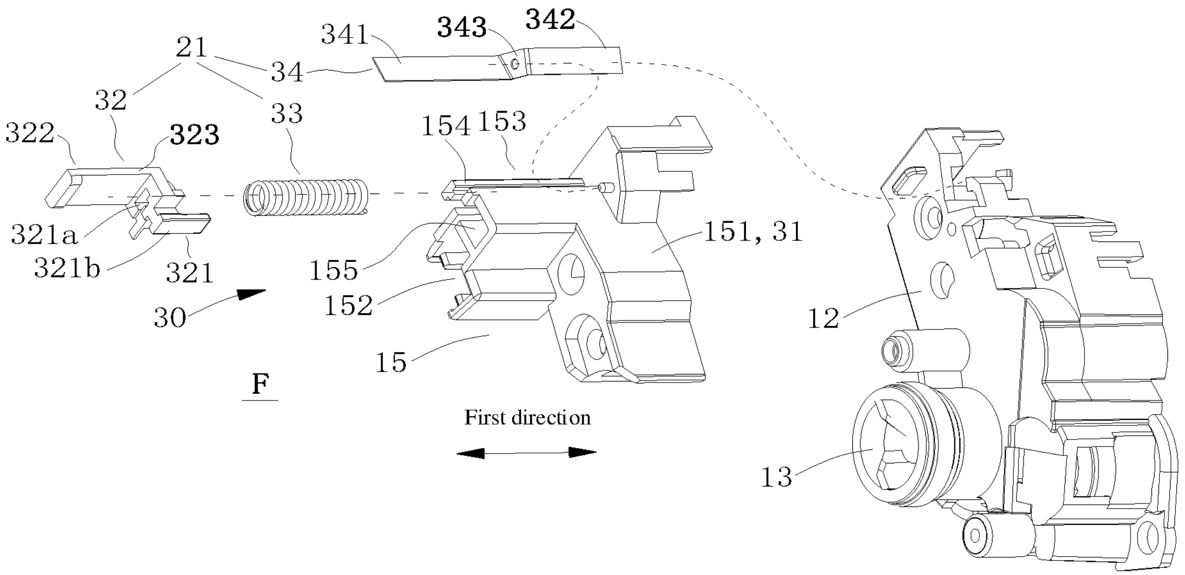
FIG. 12 is an exploded view of the driving end of the developing cartridge according to a fourth embodiment.
Figure 13A:
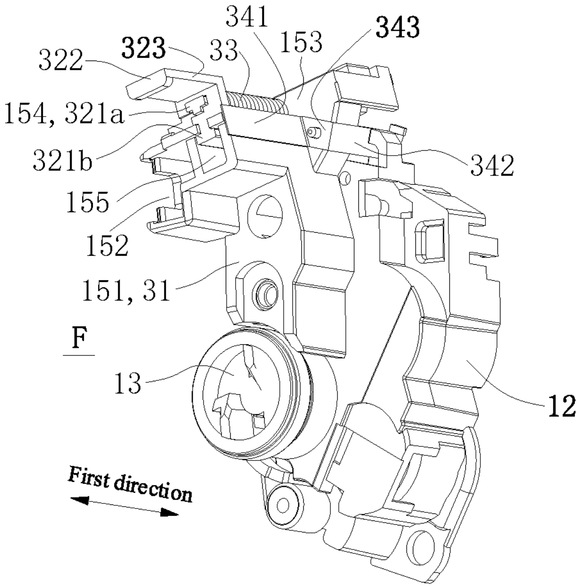
FIG. 13A is a perspective view of the first conductive member in the detected device of FIG. 12 in an extended state.
Figure 13B:
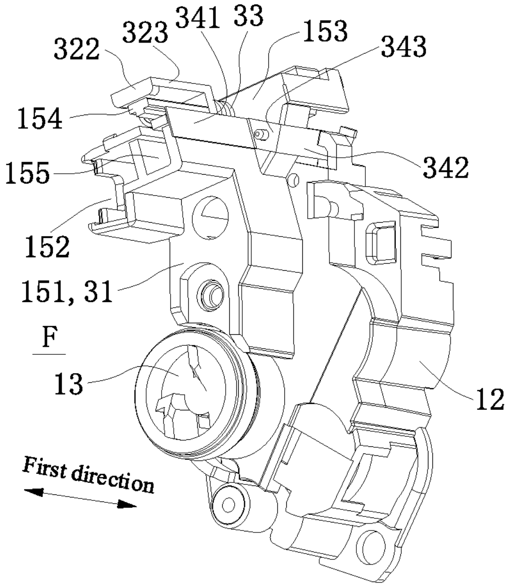
FIG. 13B is a perspective view of the first conductive member in the detected device of FIG. 12 in a retracted state.

Referring to FIG. 12 and FIG. 13, a fourth embodiment of the developing cartridge 100 is provided, which is similar to the first and the second embodiment. The first conductive member 21 in the fourth embodiment can still be switched between an extended state and a retracted state. As shown in FIG. 12, the moving assembly 30 includes a mounting base 31 and a first conductive member 21. The mounting base 31 is a part of the main body 151. The first conductive member 21 in the fourth embodiment includes a moving member 32, an elastic member 33, and a connecting member 34. At least a part of the moving member 32 is made of conductive material. The moving member 32 includes a moving portion 321 and a contact portion 322. The moving portion 321 is slidably provided on the mounting base 31, and the contact portion 322 is configured to be abut against the metal member of the imaging device.

In an embodiment, the moving portion 321 and the mounting base 31 are also in a shaft-hole fit. The moving portion 321 includes a first guiding portion **321*a* and a second guiding portion 321*b*. Correspondingly, the mounting base 31 is provided with a first guided portion 154 and a second guided portion 155. As shown in FIG. 12, the first guiding portion 321*a* is a hole, and the first guided portion 154 is a shaft. The second guiding portion 321*b* is a shaft, and the second guided portion 155 is a hole. When the first guiding portion 321*a*, the second guiding portion 321*b*, the first guided portion 154, and the second guided portion 155 are provided at the same time, a movement trajectory of the moving member 32** will be more accurate.

In some embodiments, along a direction perpendicular to an engagement direction of the first guiding portion **321*a* and the first guided portion 154, cross-sections of the first guiding portion 321*a* and the first guided portion 154 are non-circular, which may be non-regular shape, triangular, trapezoidal, etc. Through such arrangement, the first guiding portion 321*a* and the first guided portion 154 can be effectively prevented from rotating relative to each other, so that the moving trajectory of the moving member 32** will be more accurate.

In some embodiments, the cross-section of at least one of the first guiding portion **321*a* and the first guided portion 154 is non-circular, and/or the cross section of at least one of the second guiding portion 321*b* and the second guided portion 155** is non-circular.

The elastic member 33 is configured to bias the moving member 32 towards an extended state. The elastic member 33 may be a compression spring or a tension spring. At least a part of the connecting member 34 is made of conductive material. The connecting member 34 includes a first connecting portion 341, a second connecting portion 342, and a fixing portion 343. The connecting portion 341 is in contact with a contact surface 323 of the moving member 32, the second connecting portion 342 is electrically connected to the second conductive member 23. The fixing portion 343 is configured to fix the connecting member 34 to at least one of the chip holder 15, the end cover 12, and the housing 1.

Referring to FIG. 12, the chip holder 15 is also provided with a receiving cavity 153, and at least a part of the first guided portion 154 and at least a part of the second guided portion 155 are received in the receiving cavity 153. As shown in FIG. 13A, under the action of the elastic force of the elastic member 33, the contact portion 322 protrudes from the receiving cavity 153. At this time, the first conductive member 21 is in the extended state, and the contact surface 323 is in contact with the first connecting portion 341. When the protecting member 17 is mounted, through the cooperation of the guiding portion and the guided portion, the moving member 32 overcomes the elastic force of the elastic member 33 and is fully received in the receiving cavity 153. At this time, the elastic member 33 is elastically deformed to accumulate an elastic force and is in a retracted state. The contact surface 323 and the first connecting portion 341 can remains in a contact state or can be in a non-contact state.

When the protecting member 17 is removed from the chip holder 15, the elastic member 33 releases the elastic force. Through the cooperation of the guiding portion and the guided portion, the moving member 32 protrudes from the receiving cavity 153 again. The first conductive member 21 returns to the extended state from the retracted state, and the moving member 32 can abut against the metal member of the imaging device.

Similarly, in this embodiment, whether the second connecting portion 342 and the second conductive member 23 are in an electrical connection state can be controlled by a movement of the control member 2*d*. The mounting and dismounting direction of the protecting member 17 may be parallel to or intersecting with the first direction. The moving member 32 can also be provided with the guiding portion as described above, so that the user does not have to operate the moving member 32 exclusively, thereby improving the operation efficiency.

Figure 14:
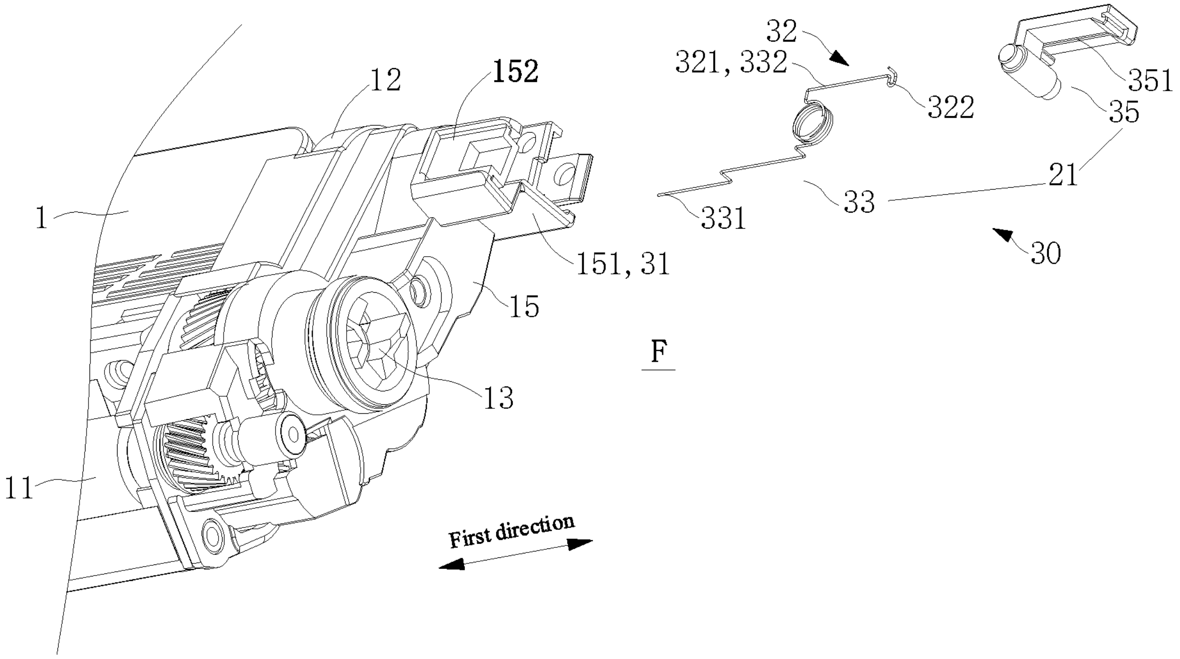
FIG. 14 is an exploded view of the driving end of the developing cartridge according to a fifth embodiment.
Figure 15:
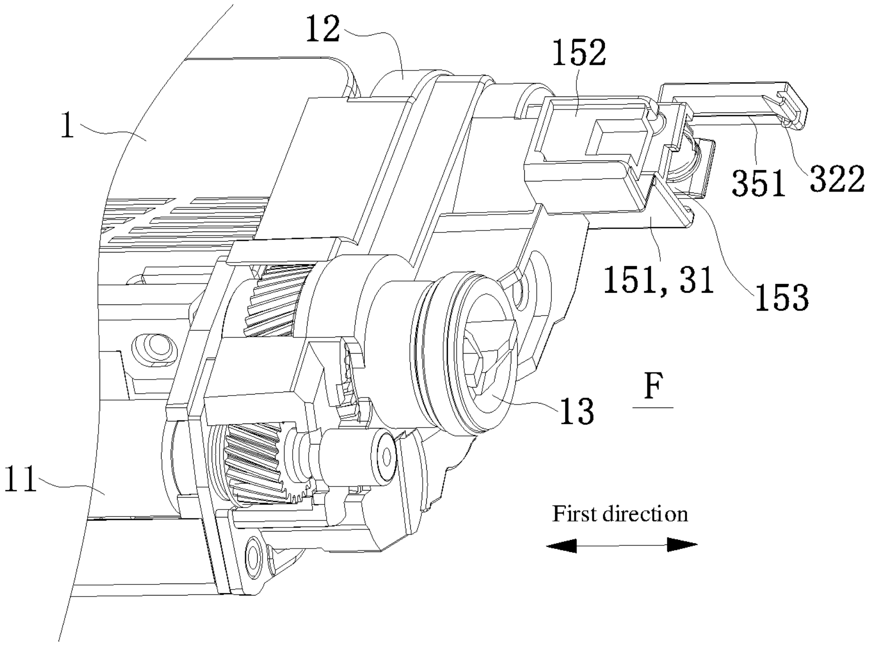
FIG. 15 is a perspective view of the first conductive member in the detected device of FIG. 14 in an extended state.

Referring to FIG. 14 and FIG. 15, the developing cartridge 100 according to a fifth embodiment is similar to that of the developing cartridge 100 in the third embodiment and the fourth embodiment, and the difference lies mainly in that the moving member 32 in this embodiment may be made of metal wire. The moving member 32 made of metal wire can be electrical connected to the second conductive member 23 in a direct contact manner or in an indirect contact manner. Further, under the action of the elastic member 33, the moving member 32 made of metal wire can rotate or slide relative to the supporting base 31.

As shown in FIG. 14, the moving member 32 in this embodiment can rotate relative to the supporting base 31, and the moving member 32 includes a moving portion 321 and a contact portion 322. The moving portion 321 is in contact with the second contact portion of the elastic member 33, and the contact portion 322 is configured to be in contact with the metal member of the imaging device. Further, the first conductive member 21 further includes a moving block 35 made of a non-conductive material. At least a part of the moving member 32 is rotatably or slidably provided on the moving block 35. Therefore, at least apart of the moving member 32 can move relative to the moving block 35.

In some embodiments, the moving block 35 is further provided with a receiving groove 351 for receiving at least a part of the moving member 32, so that the moving member 32 will have a more precise movement trajectory.

As shown in FIG. 15, the chip holder 15 has a receiving cavity 153. When the protecting member 17 is not mounted, under the action of the elastic member 33, the contact portion 322 protrudes from the receiving cavity 153. At this time, the first conductive member 21 is in the extended state. When the protecting member 17 is mounted, the moving block 35 overcomes the elastic force of the elastic member 33 and moves toward the receiving cavity 153 to be fully received in the receiving cavity 153. At this time, the first conductive member 21 is in the retracted state. When the protecting member 17 is removed, the elastic member 33 releases the elastic force, and the contact portion 322 protrudes from the receiving cavity 153 again. At this time, the first conductive member 21 is in the extended state again.

In some embodiments, the elastic member 33 is a torsion spring configure to bias the moving member 32 towards the extended state. According to the above description, the elastic member 33 can directly bias the moving member 32 towards the extended state, or the moving member 32 can be pushed to the extended state by pushing the moving block 35.

In some embodiments, the moving member 32 and the elastic member 33 are integrally formed. At this time, the moving member 32 will become a part of the elastic member 33, and the moving member 32 is electrically connected to the second conductive member 23 through the first end 331 of the elastic member 33 being in contact with the second conductive member 23. At the same time, the elastic member 33 further abut against the moving block 35, so that the moving block 35 drives the contact portion 322 (the first conductive member 21) to move towards the retracted state.

In some embodiments, the moving portion 321 is in direct contact with the second conductive member 23. At this case, the elastic member 33 only serves to bias the moving block 35. Since at least a part of the moving member 32 is provided on the moving block 35, the elastic member 33 has the tendency to make the contact portion 322 (the first conductive member 21) move towards the retracted state.

In some embodiments, the first conductive member 21 is grounded at the non-driving end NF, and the first conductive member 21 can also be switched between the retracted state and the extended state, as described in the above-mentioned embodiments, which will not be repeated here.

The aforementioned developing cartridge 100 has the following beneficial effect.

1. When the developing cartridge 100 is mounted to the imaging device, the detected device 2 located at the non-driving end NF is electrically connected to or electrically contacted with the abutting end 127 of the detecting device PE of the imaging device. The electrical connection between the detected device 2 and the abutting end 127 will be maintained as long as the developing cartridge 100 is not removed from the imaging device. Therefore, the non-driving end NF does not need to be provided with a toggling block for toggling the abutting end 127, and the structure of the non-driving end NF can be simplified.

2. The end conductive member 2*c*, the intermediating conductive member 2*b*, or the on-off assembly 2*a* can be electrically connected to the abutting end 127 of the detecting device PE, as long as the on-off assembly 2*a* can receive the driving force from the driving force receiving member 13. The on-off assembly 2*a* can be provided at a plurality of positions, for example, at the driving end F, at the non-driving end NF, or between the driving end F and the non-driving end NF. Similarly, the control member 2*d* configured to control the connection state and disconnection state of the on-off assembly 2*a* also has a plurality of positions as described above, and the design freedom of the toggling portion 2*d*2 of the control member 2*d* can be improved.

3. In some the embodiments, although the conductive member extending in the first direction needs to be provided in the detected device 2, the arrangement of the conductive member is simpler than the arrangement of a component configured to transmit the driving force, and the structure of the developing cartridge 100 is also simplified.

4. In the detected device 2, the first conductive member 21 can be switched between the extended state and the retracted state. The first conductive member 21 can be in the retracted state before the developing cartridge 100 is used, so that a package size of the developing cartridge 100 does not need to be increased, and the first conductive member 21 can be prevented from breaking or wearing during the transport of the developing cartridge 100.

5. The mounting base 31 of the moving assembly 30 is arranged as a part of the main 151, which fully utilizes the space of the main body 151, so that the overall size of the developing cartridge 100 will not increase even if the moving assembly 30 is provided.

6. The protecting member 17 can not only protect at least part of the moving member 30, but also enable the chip holder 15 to be temporarily positioned and unable to move when chip holder 15 moves relative to the housing 1 (the end cover 12), until the protecting member 17 is removed, thereby effectively preventing the chip holder 15 from moving relative to the housing 1 (the end cover 12) and falling off, or being bumped, or preventing the chip assembly being worn, etc. before the developing cartridge 100 is used.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present utility model, but are not intended to limit the protection scope of the present utility model. Any variation or replacement readily figured out by a person skilled in the art within the technical scope disclosed in the present utility model shall all fall within the protection scope of the present utility model. Therefore, the protection scope of the present utility model shall be subject to the protection scope of the appended claims.

What is claimed is:

1. A developing cartridge configured to be detachably mounted to an imaging device comprising a detecting device, the developing cartridge comprising:

a housing;

a rotating member rotatably provided in the housing;

a driving force receiving member configured to receive a driving force from the imaging device to drive the rotating member to rotate; and a detected device configured to be in electrical contact with the detecting device when the developing cartridge is mounted in the imaging device;

wherein when the rotating member is driven by the driving force receiving member to rotate, the detected device is switched between an electrical disconnection state and an electrical connection state, wherein the detected device comprises an on-off assembly and a control member, and the control member is configured to receive the driving force from the driving force receiving member to control the on-off assembly to be disconnected or connected.

2. The developing cartridge according to claim 1, wherein the control member rotates, translationally moves, or reciprocally swings.

3. The developing cartridge according to claim 1, wherein the on-off assembly comprises a first conductive member and a second conductive member, at least a part of the second conductive member is movable relative to the housing, and the control member controls the second conductive member to be electrically connected to or disconnected from the first conductive member.

4. The developing cartridge according to claim 3, wherein one end of the first conductive member is grounded.

5. The developing cartridge according to claim 3, wherein the detected device further comprises an intermediating conductive member, one end of the intermediating conductive member is electrically connected to the second conductive member, and another end of the intermediating conductive member is electrically connected to the detecting device.

6. The developing cartridge according to claim 3, wherein the detected device further comprises an intermediating conductive member and an end conductive member, the intermediating conductive member is electrically connected to the second conductive member and the end conductive member, and the end conductive member is electrically connected to the detecting device.

7. The developing cartridge according to claim 3, wherein the first conductive member is capable of switching between a retracted state and an extended state.

8. The developing cartridge according to claim 7, further comprising an end cover, a chip assembly, and a chip holder, wherein the end cover is connected to an end of the driving force receiving member, the chip holder is configured to carry the chip assembly, and the first conductive member is movably provided on at least one of the housing, the end cover, and the chip holder.

9. The developing cartridge according to claim 8, further comprising a protecting member detachably connected to the chip holder, wherein the protecting member is configured to protect the chip assembly, when the protecting member is mounted to the chip holder, the first conductive member is switched from the extended state to the retracted state.

10. The developing cartridge according to claim 9, wherein the chip assembly comprises an electrical contact portion configured to be electrically contact a contact pin of the imaging device, the chip holder comprises a main body and a chip mounting portion, the main body is connected to the housing, the first conductive member is provided on the main body, and the electrical contact portion is provided on the chip mounting portion.

11. The developing cartridge according to claim 8, wherein the first conductive member comprises a moving member and an elastic member, the moving member is movably provided on at least one of the housing, the end cover, and the chip holder, one end of the moving member is configured to abut against a metal member of the imaging device, another end of the moving member is configured to be electrically connected to the second conductive member, and the elastic member is configured to bias the moving member towards the extended state.

12. The developing cartridge according to claim 11, wherein the moving member is made of a conductive material.

13. The developing cartridge according to claim 12, wherein the first conductive member further comprises a moving block, the moving member is provided on the moving block, and the moving block is made of a non-conductive material.

14. The developing cartridge according to claim 12, wherein the moving block is provided with a receiving groove configured to receive the moving member.

15. The developing cartridge according to claim 1, wherein one end of the detected device in contact with the detecting device has a detection position, the control member receives the driving force from the driving force receiving member to move between a first position and a second position, so as to switch the on-off assembly between a disconnection state and a connection state;

when the control member is in the first position, the on-off assembly is in the disconnection state, and the detection position has a first voltage value;

when the control member is in the second position, the on-off assembly is in the connection state, and the detection position has a second voltage value different from the first voltage value.

16. A developing cartridge configured to be detachably mounted to an imaging device comprising a detecting device, the developing cartridge comprising:

a housing having a driving end and a non-driving end;

a rotating member rotatably provided in the housing;

a driving force receiving member provided at the driving end and configured to receive a driving force from the imaging device to drive the rotating member to rotate; and a detected device, wherein when the rotating member is driven by the driving force receiving member to rotate, the detected device is switched between an electrical disconnection state and an electrical connection state, detected device comprises an on-off assembly and a control member, and the control member is configured to receive the driving force from the driving force receiving member to control the on-off assembly to be disconnected or connected.

17. The developing cartridge according to claim 16, wherein the on-off assembly comprises a first conductive member and a second conductive member, at least a part of the second conductive member is movable relative to the housing, and the control member controls the second conductive member to be electrically connected to or disconnected from the first conductive member.

18. The developing cartridge according to claim 15, wherein the control member comprises:

a driving force receiving portion configured to receive the driving force;

a toggling portion configured to transmit the driving force to the on-off assembly; and a driving force disconnecting portion configured to disconnect the driving force transmitted to the driving force receiving portion.

19. The developing cartridge according to claim 18, further comprising a transmission gear connected between the rotating member and the control member, the control member is a gear having a notch in a circumferential direction thereof engaged with the transmission gear, the driving force receiving portion is gear teeth of the gear, the driving force disconnecting portion is the notch of the gear, the toggling portion protrudes from a hub of the gear in the circumferential direction.

* * * * *